May 5, 1936.   E. H. PERKINS ET AL   2,039,492
SEMITRAILER
Original Filed Oct. 21, 1933   2 Sheets-Sheet 1

INVENTORS
Edward H. Perkins
BY Hubert E. Mills
Thomas Griswold Jr. & E.C. Burdick
ATTORNEYS May 5, 1936.　　　E. H. PERKINS ET AL　　　2,039,492
SEMITRAILER
Original Filed Oct. 21, 1933　　2 Sheets-Sheet 2

INVENTORS
Edward H. Perkins
BY Hubert E. Mills
Thomas Griswold Jr. & E.C. Burdick
ATTORNEYS Patented May 5, 1936

2,039,492

UNITED STATES PATENT OFFICE 2,039,492

SEMITRAILER

Edward H. Perkins and Hubert E. Mills, Midland, Mich., assignors, by mesne assignments, to Whitehead & Kales Company, River Rouge, Mich., a corporation of Michigan Original application October 21, 1933, Serial No. 694,534. Divided and this application March 25, 1935, Serial No. 12,828

5 Claims. (Cl. 296—1)

The invention relates to the transportation of automobiles upon semi-trailers; and, more particularly, to an inclosed semi-trailer wherein automobiles are protected from hazard incident to their transportation over the highways.

It is an object of the invention to provide a suitable semi-trailer wherein three automobiles can be carried in considerably less over-all space than is possible with semi-trailers heretofore known. The term "automobile" is herein used in its broad sense, and includes passenger cars, trucks, chassis with cab, etc. By "higher portion" of an automobile is meant that portion which requires the greater clearance height; i. e., ordinarily the cab end of a truck or the rear end of a passenger automobile. The invention, then, consists of the means hereinafter fully described and particularly pointed out in the claims; the annexed drawings and the following description setting forth in detail certain means of carrying out the invention.

In said annexed drawings:—

Figure 1:
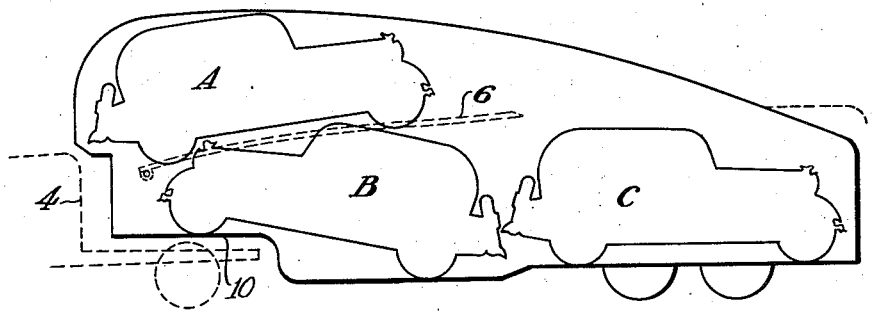
Figure 1 is a diagrammatic side view constituting a loading diagram for arranging three automobiles upon our semi-trailer.

A method of arranging three automobiles for transportation on our semi-trailer illustrated in Figures 2-5 inclusive comprises placing, in an elevated position at the forward end of the semi-trailer, an automobile with its lower portion toward the center of the semi-trailer and with the set of wheels at the end of the higher portion of the automobile depressed with respect to the set of wheels at the end of the lower portion of the automobile, then placing at the forward end of the semi-trailer, substantially below said first automobile, a second automobile with its higher portion toward the center of the semi-trailer and with the set of wheels at the end of its lower portion elevated with respect to the set of wheels at the end of its higher portion and with a part of its higher portion extending above the bottom level of the set of wheels at the end of the higher portion of the said first automobile, and then placing on the vehicle a third automobile with its higher portion endwardly adjacent the higher portion of the said second automobile.

Referring to the drawings:—

Figure 2:
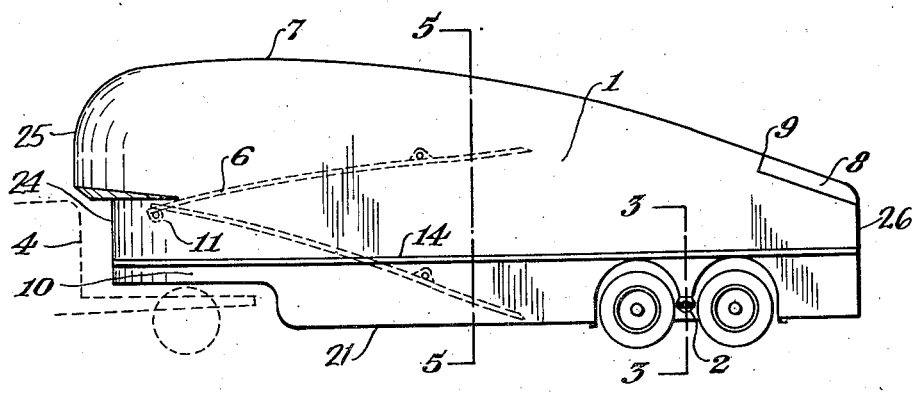
Figure 2 is a side elevation of one form of semi-trailer, illustrating the present invention.

Figure 2 is a side elevation of our completely inclosed semi-trailer or motor vehicle transport. The body 1 has a streamlined shape tapering from the forward end thereof downward toward the rear end of the semi-trailer. The floor 21 of the body has an upwardly stepped portion 10 at its forward end, which stepped portion 10 is adapted to rest upon the pulling vehicle 4. The convex front end 24 of the body has preferably a slightly protuberant portion 25 at its upper section to accommodate the spare tire, trunk rack, etc., of the upper forward car marked "A" in Figure 1. The front end portion 25 curves upwardly and rearwardly to join with the slightly rounded top 7. The top 7 terminates at the rear end in a hinged section 8 which is pivoted about a point 9 and is adapted to be swung upwardly to permit loading of cars into the body 1. A tail-gate 26 forms a closure for the rear end of the body 1. The body 1 is carried at its rear end upon an axle 2 located toward the rear end thereof, which axle is in turn carried by a tandem wheel arrangement on either side of the body. The rub rail 14, extending longitudinally of the body at a point slightly above the top of the tandem wheels, is provided to prevent damage to the paint on the sides of the trailer. Inside the body 1 of the trailer is a substantially endwardly pivoted ramp 6, pivoted at the point 11 of either side frame above the upwardly stepped portion 10 of the floor. This carrying ramp is adapted to movement so that its free end can rest upon the floor 21 of the semi-trailer.

Figure 4:
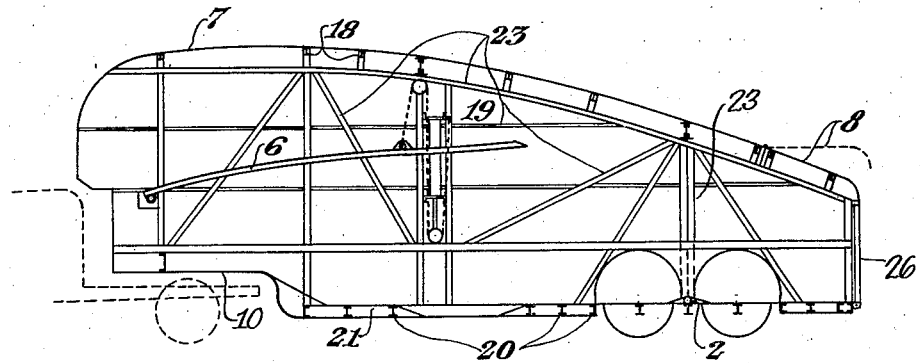
Figure 4 is a longitudinal sectional elevation of the semi-trailer shown in side elevation in Figure 2.

Referring now to Figure 4, there is shown a side frame member 23 adapted to be sheathed with a suitable sheathing such as Dow metal. The side frame 23 comprises a number of structural members, which may be structural angles, channels, or similar standard shapes. The hoisting mechanism 19 for elevating the swinging ramp 6 is shown attached to the side frames 23. The cross members 18 support the roof 7 and serve to tie together the frame 23 on either side of the trailer. The cross-members 20 carry the floor 21 and tie together the frame 23 on either side of the trailer at the lower edge thereof.

Figure 5:
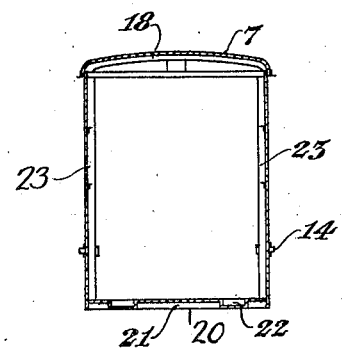
Figure 5 is a transverse section taken on the line 5—5 of Figure 2.

In Figure 5 the relationship between the side frames 23, the cross-members 18 carrying the roof 7, and the floor 22 is clearly shown. The floor 21 at the section line 5—5 on Figure 2 is provided with tire wells in which the rear wheels of the automobile B of Figure 1 are adapted to rest during transit. This permits lowering the height of the vehicle from 3 or 4 inches more than would be possible if the wheels of the car B rested on the floor 21.

Figure 3:
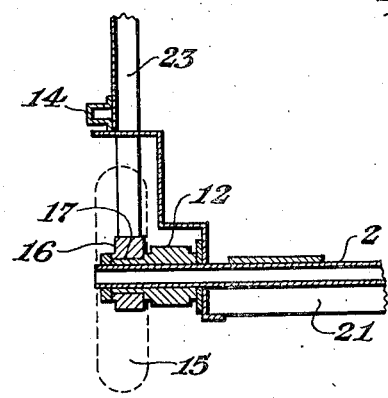
Figure 3 is an enlarged part section taken on the line 3—3 of Figure 2.

Referring now to Figure 3, which is a transverse part section of the axle, walking beam, and side frame assembly, the side frame member 23 rests upon the bearing cap 16 containing the sleeve 17. This sleeve 17 is welded to the rocker beam 12, which beam is carried on the axle 2 laterally inside the bearing cap supporting the side frame 23. The floor 21 lies substantially below the level of the axle 2. The tandem wheels 15 are substantially aligned laterally with the side frame 23.

In Figure 1 is shown the arrangement of automobiles obtained by the carrying out of the hereinbefore described method of loading three automobiles upon the semi-trailer illustrated in above described figures. The automobile A is first run upon the swinging ramp 6 when the free end of the ramp is at rest upon the floor of the semi-trailer. After this automobile is in position upon the ramp, and has been suitably fastened, the free end of the ramp is swung upwardly to bring the ramp and automobile into the position shown in the diagram. The automobile B is then moved substantially under the automobile A, and the automobile C is placed upon the floor with its higher portion adjacent the automobile B.

It is apparent from the foregoing description that our invention provides a new semi-trailer for carrying three automobiles in a minimum of length and height.

This application is a division of our prior filed application Serial Number 694,534, filed October 21, 1933.

Other modes of applying the principle of our invention may be employed instead of those explained, change being made as regards the mechanism herein disclosed, provided the means stated by any of the following claims or the equivalent of such stated means be employed.

We therefore particularly point out and distinctly claim as our invention:—

1. Transportation means of the class described comprising a semi-trailer having upright side walls, automobile carrying means between said side walls including a flooring extending substantially horizontally from the rear end of the trailer to a point adjacent its forward end and provided at the forward end of the trailer with an upwardly stepped portion, pivot means carried by and fixed relative to said side walls in vertically spaced relation to said stepped portion, an automobile carrying ramp carried by said pivot means and movable vertically relative to said flooring, the rear end of said ramp being movable to said flooring in rear of said stepped portion to receive an automobile from said flooring and movable upwardly to a position a sufficient distance above said flooring to permit a set of wheels at one end of an automobile to rest on said flooring below said ramp, and said pivot means being elevated sufficiently relative to the stepped portion to permit the set of wheels at the other end of said automobile to rest on the stepped portion below said ramp, and means carried by the trailer and associated with the ramp at one end thereof for manipulating the ramp about its pivot for loading and unloading purposes as aforesaid.

2. Transportation means of the class described comprising a semi-trailer having upright side walls, automobile carrying means between said side walls extending from the rear end of the trailer to a point adjacent its forward end and provided at the forward end of the trailer with an upwardly stepped portion, pivot means carried by and fixed relative to said side walls above said stepped portion, an automobile carrying ramp carried by said pivot means and movable vertically relative to said automobile carrying means, one end of said ramp being movable to said automobile carrying means to receive an automobile therefrom and movable to a position a sufficient distance above said automobile carrying means to permit a set of wheels at one end of an automobile to be carried by said automobile carrying means below said ramp, and said pivot means being elevated sufficiently relative to the stepped portion to permit the set of wheels at the other end of said automobile to be carried by the stepped portion below said ramp, and means carried by the trailer and associated with the ramp at one end thereof for manipulating the ramp about its pivot for loading and unloading purposes as aforesaid.

3. Transportation means of the class described comprising a semi-trailer of the enclosed type having upright sides, automobile carrying means between said sides extending from the rear end of the trailer to a point adjacent its forward end and provided at the forward end of the trailer with an upwardly stepped portion, pivot means carried by and fixed relative to said upright sides in vertically spaced relation to said stepped portion, an automobile carrying ramp carried by said pivot means and movable vertically relative to said automobile carrying means, one end of said ramp being movable to said automobile carrying means to receive an automobile therefrom and movable to a position a sufficient distance above said automobile carrying means to permit a set of wheels at one end of an automobile to be carried by said automobile carrying means below said ramp, and said pivot means being elevated sufficiently relative to the stepped portion to permit the set of wheels at the other end of said automobile to be carried by the stepped portion below said ramp, and means carried by the trailer and associated with the ramp at one end thereof for manipulating the ramp about its pivot for loading and unloading purposes as aforesaid.

4. Transportation means of the class described comprising a semi-trailer having upright side frames, automobile carrying means between said side frames extending from the rear end of the trailer to a point adjacent its forward end and provided at the forward end of the trailer with an upwardly stepped portion, pivot means carried by and fixed relative to said side frames above said stepped portion, an automobile carrying ramp connected at one end to said pivot means whereby its other end is movable vertically relative to said automobile carrying means, said other end being movable to said automobile carrying means to receive an automobile therefrom and movable to a position a sufficient distance above said automobile carrying means to permit a set of wheels at one end of an automobile to be carried by said automobile carrying means below said ramp, and said pivot means being elevated sufficiently relative to the stepped portion to permit the set of wheels at the other end of said automobile to be carried on the stepped portion below said ramp, and means carried by the trailer and associated with the ramp at one end thereof for manipulating the ramp about its pivot for loading and unloading purposes as aforesaid.

5. Transportation means of the class described comprising a semi-trailer having upright side frames, automobile carrying means between said side frames extending from the rear end of the trailer to a point adjacent its forward end and provided at the forward end of the trailer with an upwardly stepped portion, an automobile carrying ramp pivotally connected at its forward end to said upright side frames at a point above the stepped portion aforesaid and movable to said automobile carrying means to receive an automobile therefrom and movable upwardly away from said automobile carrying means to a position a sufficient distance above said automobile carrying means to permit a set of wheels at one end of an automobile to be carried by said automobile carrying means below said ramp, the pivot point aforesaid of said ramp being fixed relative to the upright side frames a sufficient distance above the stepped portion to permit the set of wheels at the other end of said automobile to be carried by said stepped portion below said ramp, and means carried by the trailer and associated with the ramp at one end thereof for manipulating the ramp about its pivot for loading and unloading purposes as aforesaid.

EDWARD H. PERKINS.
HUBERT E. MILLS.